(12) United States Patent
Sasaki

(10) Patent No.: US 12,078,758 B2
(45) Date of Patent: Sep. 3, 2024

(54) RANGING MODULE DEVICE AND METHOD THEREOF

(71) Applicant: DENSO CORPORATION, Kariya (JP)

(72) Inventor: Hikaru Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 790 days.

(21) Appl. No.: 17/190,837

(22) Filed: Mar. 3, 2021

(65) Prior Publication Data

US 2021/0286054 A1 Sep. 16, 2021

(30) Foreign Application Priority Data

Mar. 16, 2020 (JP) ................................ 2020-045191

(51) Int. Cl.

| G01S 7/48 | (2006.01) |
|---|---|
| G01S 7/481 | (2006.01) |
| G01S 7/4913 | (2020.01) |
| G01S 7/4915 | (2020.01) |
| G01S 7/497 | (2006.01) |
| G01S 17/06 | (2006.01) |

(52) U.S. Cl.
CPC .......... *G01S 7/4817* (2013.01); *G01S 7/4913* (2013.01); *G01S 7/4915* (2013.01); *G01S 7/4972* (2013.01); *G01S 17/06* (2013.01)

(58) Field of Classification Search
None
See application file for complete search history.

(56) References Cited

U.S. PATENT DOCUMENTS

| 2011/0063170 | A1 | 3/2011 | Ookawa |
| 2019/0089460 | A1 | 3/2019 | Khachaturian et al. |
| 2019/0129008 | A1 | 5/2019 | Lin et al. |
| 2019/0310359 | A1* | 10/2019 | Lee ..................... G01S 13/0218 |
| 2020/0158839 | A1 | 5/2020 | Lin et al. |

FOREIGN PATENT DOCUMENTS

JP 2012-159327 A 8/2012

* cited by examiner

*Primary Examiner* — Hovhannes Baghdasaryan
(74) *Attorney, Agent, or Firm* — Posz Law Group, PLC

(57) ABSTRACT

A signal receiver unit includes a first receiver unit which is designed to receive reflected electromagnetic waves created by a main lobe and two grating lobes of projected electromagnetic wave. The signal receiver unit includes a second receiver unit which is designed to receive reflected electromagnetic waves created by the main lobe and one grating lobe of the projected electromagnetic wave. The signal receiver unit includes a third receiver unit which is designed to receive reflected electromagnetic waves created by the main lobe and the other grating lobe of the projected electromagnetic wave. The signal processor unit identifies the reflected electromagnetic waves based on combinations of the received signals of the first receiver unit, the second receiver unit, and the third receiver unit, and calculates a distance to an object.

9 Claims, 10 Drawing Sheets

RANGING MODULE DEVICE AND METHOD THEREOF

CROSS REFERENCE TO RELATED APPLICATIONS

The present application is based on and claims the benefit of priority from Japanese Patent Application No. 2020-45191 filed in Japan filed on Mar. 16, 2020, the entire disclosure of the above application is incorporated herein by reference.

TECHNICAL FIELD

This disclosure relates to a device and method for a ranging module having a phased array structure.

BACKGROUND

In a technical field of ranging modules such as LiDAR (Light Detection and Ranging), an electromagnetic wave such as an invisible light and millimeter wave or the like are used. The electromagnetic wave is projected to scan space to detect an object. The electromagnetic wave is projected as a main lobe and side grating lobes. It is required to reduce an adverse effect between the lobes, and to use the lobes efficiently.

SUMMARY

In the above aspects, or in other aspects not mentioned, there is a need for further improvements in a device and method for a ranging module.

According to an aspect of this disclosure, a device comprises: a signal transmitter unit which transmits electromagnetic waves; a scanner unit which scans the electromagnetic wave transmitted by the signal transmitter unit into space to create a projected electromagnetic wave; a signal receiver which receives reflected electromagnetic waves from an object and outputs a received signal; and a signal processor unit which calculates a distance to the object based on a received signal of the signal receiver unit. The signal receiver unit includes: a first receiver unit which is designed to receive reflected electromagnetic waves created by a main lobe and two grating lobes of the projected electromagnetic wave; a second receiver unit which is designed to receive reflected electromagnetic waves created by the main lobe and one grating lobe of the projected electromagnetic wave; and a third receiver unit which is designed to receive reflected electromagnetic waves created by the main lobe and the other grating lobe of the projected electromagnetic wave. The signal processor unit determines that which one of the reflected electromagnetic waves created by the main lobe or the one grating lobe or the other grating lobe of the projected electromagnetic wave corresponds to the electromagnetic wave received by the signal receiver unit based on combinations of the received signals of the first receiver unit, the second receiver unit, and the third receiver unit, and calculates a distance to the object.

According to this configuration, the signal receiver unit includes a first receiver unit which receives the main lobe and two grading lobes, a second receiver unit which receives the main lobe and one of the grading lobes, and a third receiver unit which receives the main lobe and the other one of the grating lobes. The signal processor unit uses a combination of three received signals to calculate a distance. As a result, even if the strength of each received signal is low, the overall signal strength can be maintained high. As a result, it is possible to suppress an increase in the number of light receiving elements and suppress an increase in physique.

BRIEF DESCRIPTION OF DRAWINGS

The disclosure is further described with reference to the accompanying drawings in which.

DETAILED DESCRIPTION

Hereinafter, embodiments is described with reference to the drawings. In the respective embodiments described herein, identical or equivalent parts are given identical reference numbers.

LIDAR (Light Detection and Ranging) having an OPA (Optical Phased Array) structure is known. LiDAR is also called a ranging module device. In the ranging module device, in addition to a main lobe of a projected light, at least one grating lobe light projected at an angle different from the main lobe light appears.

In the ranging module device, a light projection OPA is designed so that an angle between the main lobe light and the grating lobe light is at least three times a scanning angle so that the grating lobe light does not fall within a scanning range of the main lobe light. In the light receiving OPA, a light receiving angle is designed so that a light from a direction in which the main lobe light is projected is received in synchronization with the projection and the grating lobe light is out of the light receiving range.

Some LiDAR systems may measure a distance to an object using the grating lobe light in addition to the main lobe light. However, some LiDAR system may be provided with separate light receiving portions for each of the main lobe light and the grating lobe light. In this configuration, the number of light receiving elements required is large, so that a physique of the device is large.

In view of the above points, it is an object of the present disclosure to provide a distance measuring module capable of suppressing an increase in physique.

First Embodiment

Figure 1:
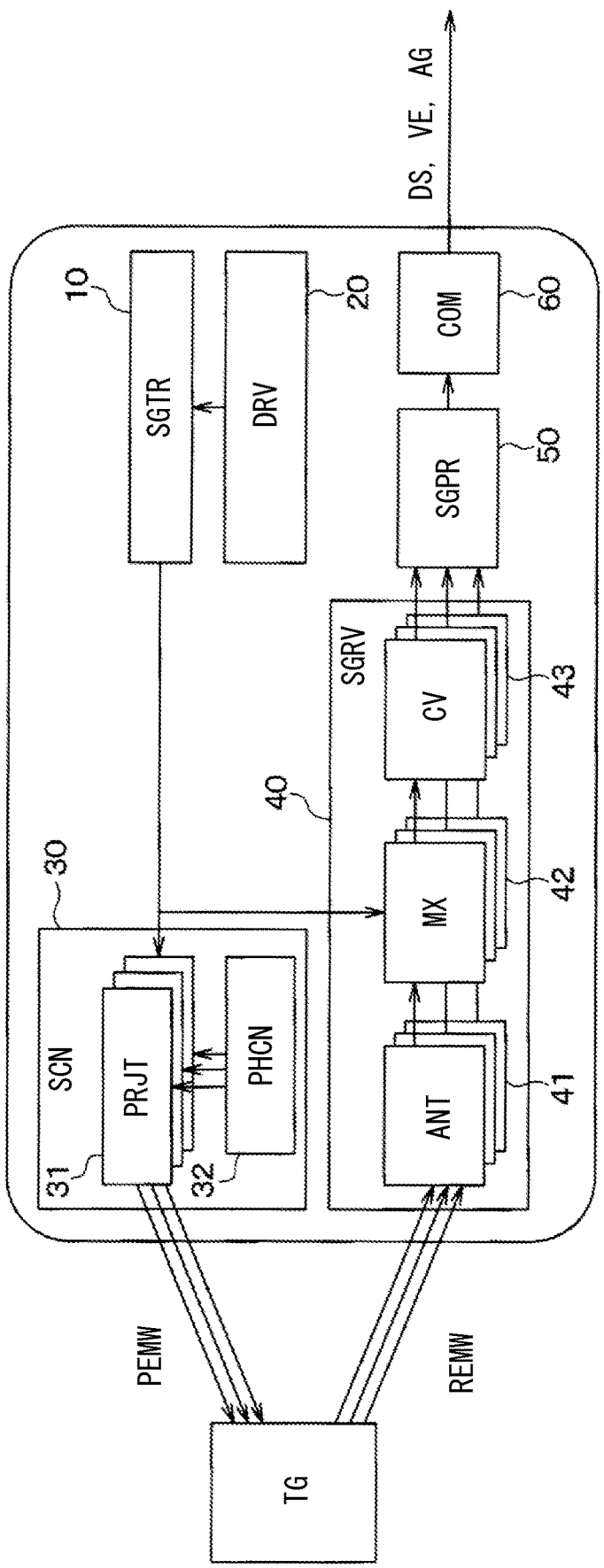
FIG. 1 is a block diagram of a ranging module device according to a first embodiment.

A first embodiment is described below. A ranging module shown in FIG. 1 is mounted on a vehicle and is configured to at least measure a distance between the vehicle and an object (TG) by transmitting and receiving electromagnetic waves. The ranging module is composed of an integrated chip formed on an SOI (Silicon on Insulator) substrate by silicon photonics. Light or millimeter waves are used as the electromagnetic waves.

As shown in FIG. 1, the ranging module device includes a signal transmitter unit 10 (SGTR), a transmission drive unit 20 (DRV), and a scanner unit 30 (SCN). The signal transmitter unit 10 generates and outputs an electromagnetic wave as a transmission signal. The transmission drive unit 20 drives the signal transmitter unit 10. The scanner unit 30 scans space with the electromagnetic waves output by the signal transmitter unit 10. In this embodiment, space may be a three-dimensional extent around a vehicle. The electromagnetic waves are emitted and projected so as to scan space. The electromagnetic waves that scan space are also called projected electromagnetic 20) waves (PEMW).

The signal transmitter unit 10 and the transmission drive unit 20 are connected by a metal wiring such as Al formed on the SOI substrate. The signal transmitter unit 10 and the scanner unit 30 are connected by at least one waveguide including a core layer made of Si or the like and a clad layer made of SiO2 or the like. The signal transmitter unit 10 includes, e.g., a laser diode. The signal transmitter unit 10 generates light by supplying an electric current from the transmission drive unit 20.

The scanner unit 30 includes a projection unit 31 (PRJT) and a phase control unit 32 (PHCN). The projection unit 31 projects the electromagnetic wave transmitted from the signal transmitter unit 10 into space. The phase control unit 32 drives the projection unit 31. The projection unit 31 is composed of OPAs in which the waveguides are branched and arranged in parallel, and the electromagnetic waves are emitted from ends of the plurality of waveguides arranged in parallel.

The phase control unit 32 is configured to change a phase of the electromagnetic wave emitted from the projection unit 31 in response to an electric signal input from the control circuit (not shown). The projection unit 31 includes a plurality of waveguides as components. The phase of the electromagnetic wave passing through each one of the plurality of waveguides is periodically changed by the phase control unit 32. As a result, the phases of the electromagnetic waves emitted from the plurality of waveguides changes periodically. As a result, a directivity of the electromagnetic wave emitted from the entire projection unit 31 changes. As a result, the electromagnetic wave is emitted in an arbitrary direction, and space is scanned by changing the direction.

In addition to the signal transmitter unit 10 and the like, the ranging module device includes configurations to receive reflected electromagnetic waves (REMW) from an object. The ranging module device includes a signal receiver unit 40 (SGRV), a signal processor unit 50 (SGPR), and a communication unit 60 (COM). The signal receiver unit 40 receives the reflected electromagnetic wave and outputs the received signal. The signal processor unit 50 calculates the distance to the object and the like based on the received signal of the signal receiver unit 40. The communication unit 60 transmits the distance and the like calculated by the signal processor unit 50 to the ECU and the like of the vehicle. The signal transmitted by the communication unit 60 may include a distance signal DS, a speed signal VE, and an angle signal AG.

The signal receiver unit 40 includes an antenna unit 41 (ANT), a multiplexer unit 42 (MX), and an electric conversion unit 43 (CV). The antenna unit 41 is configured to receive electromagnetic waves from an outside. The antenna unit 41 has a phased array structure including a plurality of waveguides arranged in parallel. The antenna unit 41 is configured so that an electromagnetic wave is introduced from an end of each waveguide. A phase shifter (not shown) is arranged in each waveguide. The antenna unit 41 controls the phase of the electromagnetic wave introduced to each waveguide by the phase shifter. As a result, the antenna unit 41 can control an introducing direction of the electromagnetic wave in the entire antenna unit 41.

The plurality of waveguides constituting the antenna unit 41 are merged into one and are connected to the multiplexer unit 42. The electromagnetic wave received by the antenna unit 41 is multiplexed with the electromagnetic wave output by the signal transmitter unit 10 by the multiplexer unit 42. As a result, a beat signal is generated. This is because a distance to the object is measured by FMCW (Frequency Modulated Continuous Wave) method.

The multiplexer unit 42 is connected to the electric conversion unit 43 by a waveguide. The electromagnetic wave multiplexed by the multiplexer unit 42 is transmitted to the electric conversion unit 43. The electric conversion unit 43 includes a plurality of components (for example, a photoelectric conversion unit), a current-voltage conversion unit, and an analog-digital conversion unit (not shown). The photoelectric conversion unit is composed of a photodiode or the like. The current-voltage conversion unit is composed of a trans-impedance amplifier or the like. The analog-to-digital converter converts an analog signal into a digital signal. The electric conversion unit 43 is connected to the signal processor unit 50 by metal wiring. The electromagnetic wave transmitted to the electric conversion unit 43 is converted into a digital signal and transmitted to the signal processor unit 50.

Figure 2:
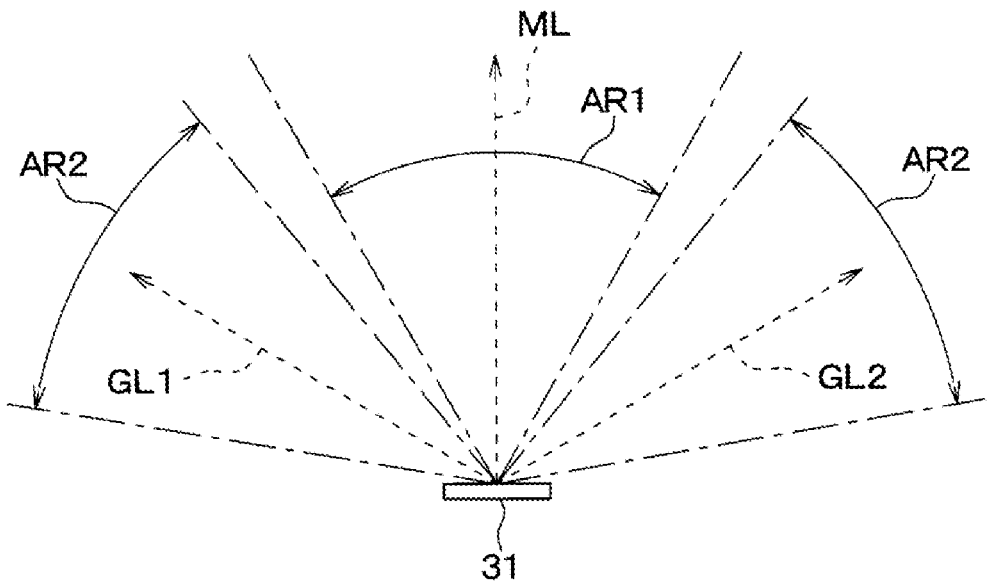
FIG. 2 is a diagram for explaining a main lobe and grating lobes of projected electromagnetic waves.

In the ranging module provided with the projection unit having a phased array structure, as shown in FIG. 2, the electromagnetic wave is projected in three parts. That is, the projected electromagnetic wave is divided into a main lobe ML controlled by the phase control unit 32 in a desired direction and two grating lobes GL1 and GL2 projected on both sides of the main lobe ML. Then, when the main lobe ML is scanned as shown by an arrow AR1, the grating lobes GL1 and GL2 are also scanned as shown by arrows AR2 and AR2. As a result, the reflected electromagnetic waves of the grating lobes GL1 and GL2 are generated as well as the reflected electromagnetic waves of the main lobe ML. As a result, both the reflected electromagnetic wave of the main lobe ML and the reflected electromagnetic waves of the grating lobes GL1 and GL2 are introduced into the ranging module.

The ranging module of the present embodiment has a configuration for measuring a spatial index such as a distance to an object reflecting each of a plurality of lobes based on received electromagnetic waves. The ranging module determines which one of the reflected electromagnetic waves created by the main lobe ML or the grating lobe GL1 or the grating lobe GL2 of the projected electromagnetic wave corresponds to the received electromagnetic wave. The ranging module determines which one of the reflected electromagnetic waves created by the main lobe ML or the grating lobe GL1 or the grating lobe GL2 corresponds to the received electromagnetic wave. The ranging module has a configuration to measure a distance to an object based on the lobe that created the reflected electromagnetic wave based on the determination result.

Figure 3:
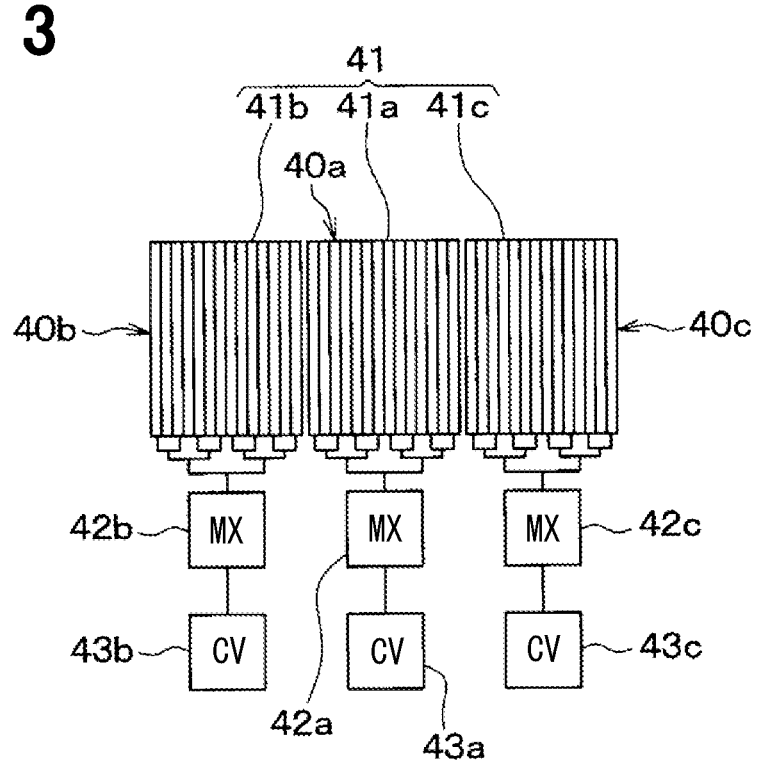
FIG. 3 is a diagram showing a configuration of the signal receiver unit shown in FIG. 1.

Specifically, as shown in FIG. 3, the antenna unit 41 includes an antenna unit 41a, an antenna unit 41b, and an antenna unit 41c. Each of the antenna units 41a, 41b, and 41c is composed of a plurality of waveguides. Phase shifters are arranged in the plurality of waveguides. The antenna units 41a, 41b, and 41c are set to receive electromagnetic waves from different directions.

The antenna unit 41a is set to receive the reflected electromagnetic waves of the main lobe ML and the two grating lobes GL1 and GL2 of the projected electromagnetic wave. The antenna unit 41b is set to receive the reflected electromagnetic waves of the main lobe ML and the one grating lobe GL1 of the projected electromagnetic wave. The antenna unit 41c is set to receive the reflected electromagnetic waves of the main lobe ML and the other grating lobe GL2 of the projected electromagnetic wave.

The multiplexer unit 42 and the electric conversion unit 43 have an array structure corresponding to the antenna unit 41. Specifically, the multiplexer unit 42 includes a multiplexer unit 42a, a multiplexer unit 42b, and a multiplexer unit 42c. The electric conversion unit 43 includes an electric conversion unit 43a, an electric conversion unit 43b, and an electric conversion unit 43c. The electromagnetic waves received by the antenna units 41a, 41b, and 41c are multiplexed separately from the electromagnetic waves output by the signal transmitter unit 10 by the multiplexer units 42a, 42b, and 42c. Each of the multiplexed electromagnetic waves is converted into a received signal by the electric conversion units 43a, 43b, and 43c.

A part of the signal receiver unit 40 configured by the antenna unit 41a, the multiplexer unit 42a, and the electric conversion unit 43a is also referred to as a first receiver unit 40a. A part of the signal receiver unit 40 configured by the antenna unit 41b, the multiplexer unit 42b, and the electric conversion unit 43b is also referred to as a second receiver unit 40b. A part of the signal receiver unit 40 configured by the antenna unit 41c, the multiplexer unit 42c, and the electric conversion unit 43c is also referred to as a third receiver unit 40c.

The signal processor unit 50 determines one of the lobes based on combinations of the received signals of these three receiver units. The signal processor unit 50 determines that the electromagnetic wave received by the signal receiver unit 40 corresponds to which of the reflected electromagnetic wave caused by the main lobe ML, the one grating lobe GL1, or the other grating lobe GL2 of the projected electromagnetic wave. The signal processor unit 50 calculates the distance to the object for each of the main lobe ML and the two 10) grating lobes GL1 and GL2.

Figure 4:
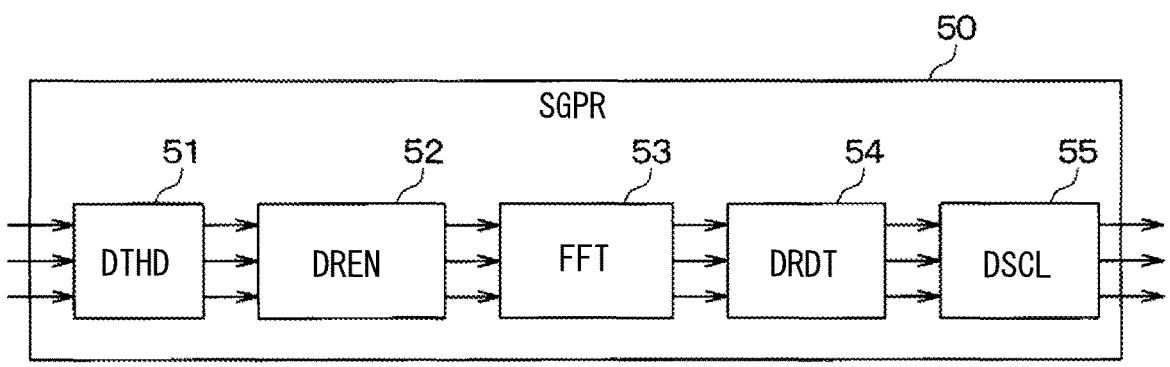
FIG. 4 is a block diagram of the signal processor unit shown in FIG. 1.

As shown in FIG. 4, the signal processor unit 50 includes a data holding unit 51 (DTHD), a direction encoder unit 52 (DREN), an FFT processor unit 53 (FFT), a direction determination unit 54 (DRDT), and a distance calculation unit 55 (DSCL). The signal processor unit 50 is composed of, e.g., a DSP (Digital Signal Processor). The data holding unit 51 holds the received signal output by the electric conversion unit 43. The direction encoder unit 52 encodes the received signal held by the data holding unit 51.

Figure 5:
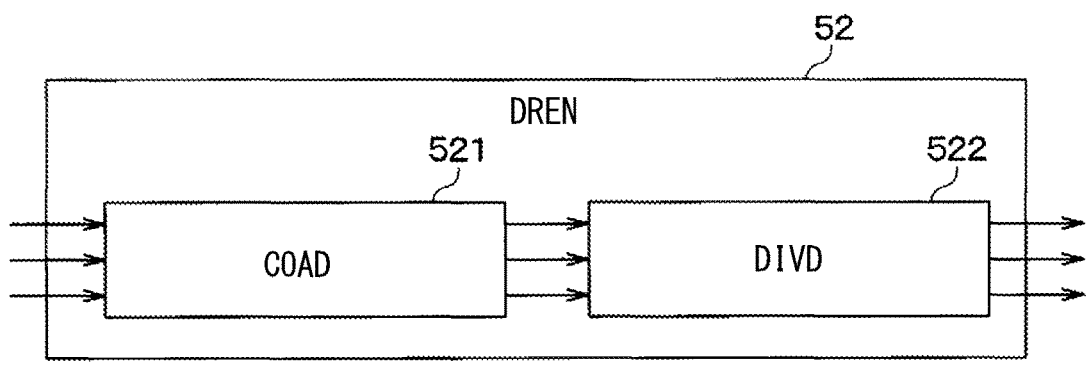
FIG. 5 is a block diagram of the direction coding unit shown in FIG. 4.

As shown in FIG. 5, the direction encoder unit 52 includes a combination adding unit 521 (COAD) and a division unit 522 (DIVD). The received signals of the electromagnetic waves received by the antenna units 41a, 41b, and 41c are added by a combination adding unit 521, then divided by the division unit 522 by the number of the added signals, and averaged.

In the following description, the received signal of the first receiver unit 40a is referred to as a first received signal (#1RSSG). The received signal of the second receiver unit 40b is called a second received signal (#2RSSG). The received signal of the third receiver unit 40c is called a third received signal (#3RSSG). The direction encoder unit 52 adds the first received signal and the second received signal and then averages them to obtain a first added signal (#1ADSG). The direction encoder unit 52 adds the first received signal and the third received signal and then averages them to obtain a second added signal (#2ADSG). The direction encoder unit 52 adds the first received signal, the second received signal, and the third received signal and then averages them to obtain a third added signal (#3ADSG). These plurality of added signals are transmitted to the FFT processor unit 53.

The FFT processor unit 53 performs FFT processing on the added signals transmitted from the direction encoder unit 52, and detects a frequency. The FFT processor unit 53 transmits the frequency detection result and the signal transmitted from the direction encoder unit 52 to the direction determination unit 54.

Figure 6:
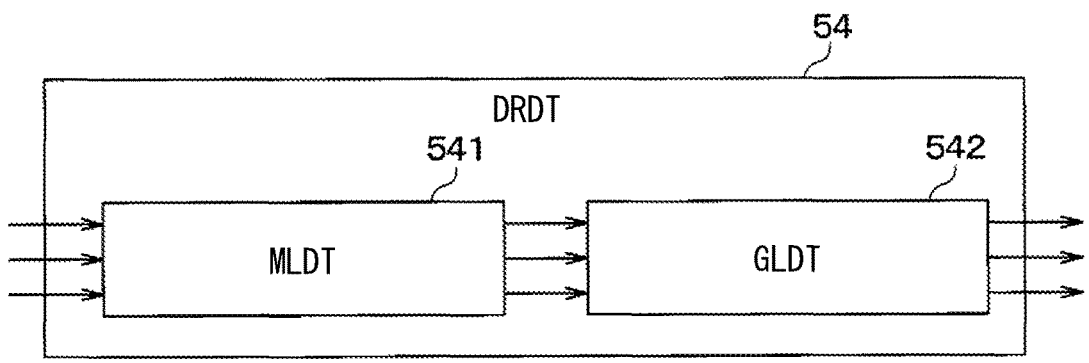
FIG. 6 is a block diagram of the direction determination unit shown in FIG. 4.

As shown in FIG. 6, the direction determination unit 54 includes a main lobe determination unit 541 (MLDT) and a grating lobe determination unit 542 (GLDT). The main lobe determination unit 541 is configured to determine whether or not the electromagnetic wave received by the signal receiver unit 40 corresponds to the reflected electromagnetic wave caused by the main lobe ML of the projected electromagnetic wave. The grating lobe determination unit 542 is configured to determine whether or not the electromagnetic wave received by the signal receiver unit 40 corresponds to the reflected electromagnetic wave caused by the grating lobes GL1 and GL2 of the projected electromagnetic wave.

The main lobe determination unit 541 determines, among a plurality of signals appeared on a plurality of added signals, a signal at the time when the signal strength is maximized in common among the plurality of added signals as a received signal which is outputted by the signal receiver unit 40 when receiving the reflected electromagnetic wave caused by the main lobe ML of the projected electromagnetic wave. The plurality of added signals include a first added signal, a second added signal, and a third added signal. A signal at the time when a signal strength is maximized in common among the plurality of added signals is also called a main signal or a maximum strength signal.

The grating lobe determination unit 542 determines, among the remaining signals excluding the main signal, a signal appeared greater on the plurality of first added signals than the plurality of second added signals as a received signal which is outputted by the signal receiver unit 40 when receiving the reflected electromagnetic wave caused by the one grating lobe GL1 of the projected electromagnetic wave. A signal that appears greater in the first added signal than in the second added signal is called a first relative strength signal.

The grating lobe determination unit 542 determines a signal appeared greater on the plurality of second added signals than the plurality of first added signals as a received signal which is outputted by the signal receiver unit 40 when receiving the reflected electromagnetic wave caused by the other grating lobe GL2 of the projected electromagnetic wave. The direction determination unit 54 transmits the determination results of the main lobe ML, the grating lobes GL1 and GL2, and the frequency detection result transmitted from the FFT processor unit 53 to the distance calculation unit 55. A signal that appears greater in the second added signal than in the first added signal is called a second relative strength signal.

The distance calculation unit 55 is configured to calculate the distance to the object and the speed of the object based on the information transmitted from the direction determination unit 54. In the present embodiment, the distance calculation unit 55 calculates the distance and the velocity of both the object reflecting the main lobe ML of the projected electromagnetic wave and the object reflecting the grating lobes GL1 and GL2. The distance and speed and the relative movement direction (direction or angle) of the object calculated by the signal processor unit 50 are transmitted to the ECU or the like by the communication unit 60 as a distance signal DS, a speed signal VE, and an angle signal AG.

Figure 7:
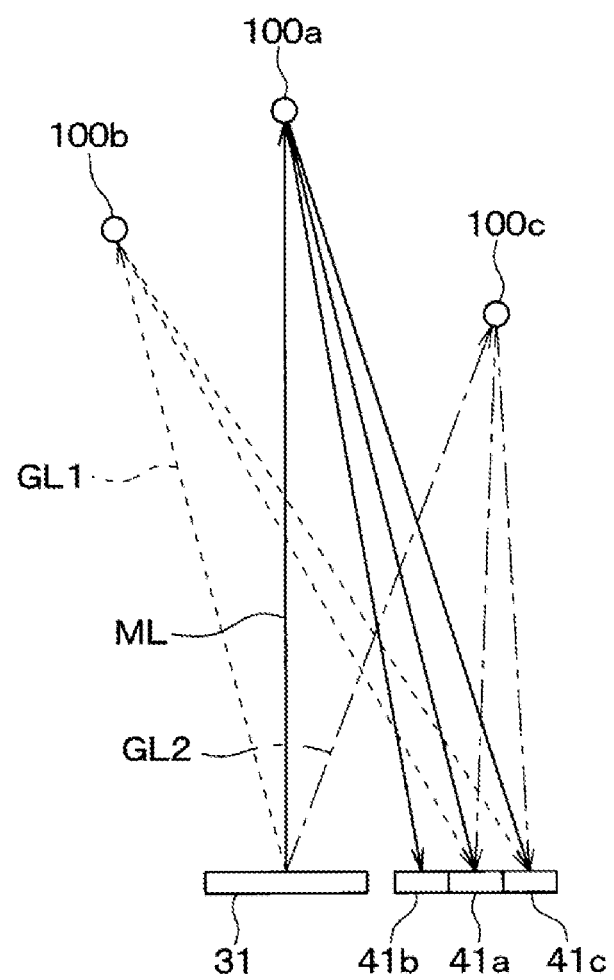
FIG. 7 is a diagram showing a state in which reflected electromagnetic waves are received by three antenna units.
Figure 8:
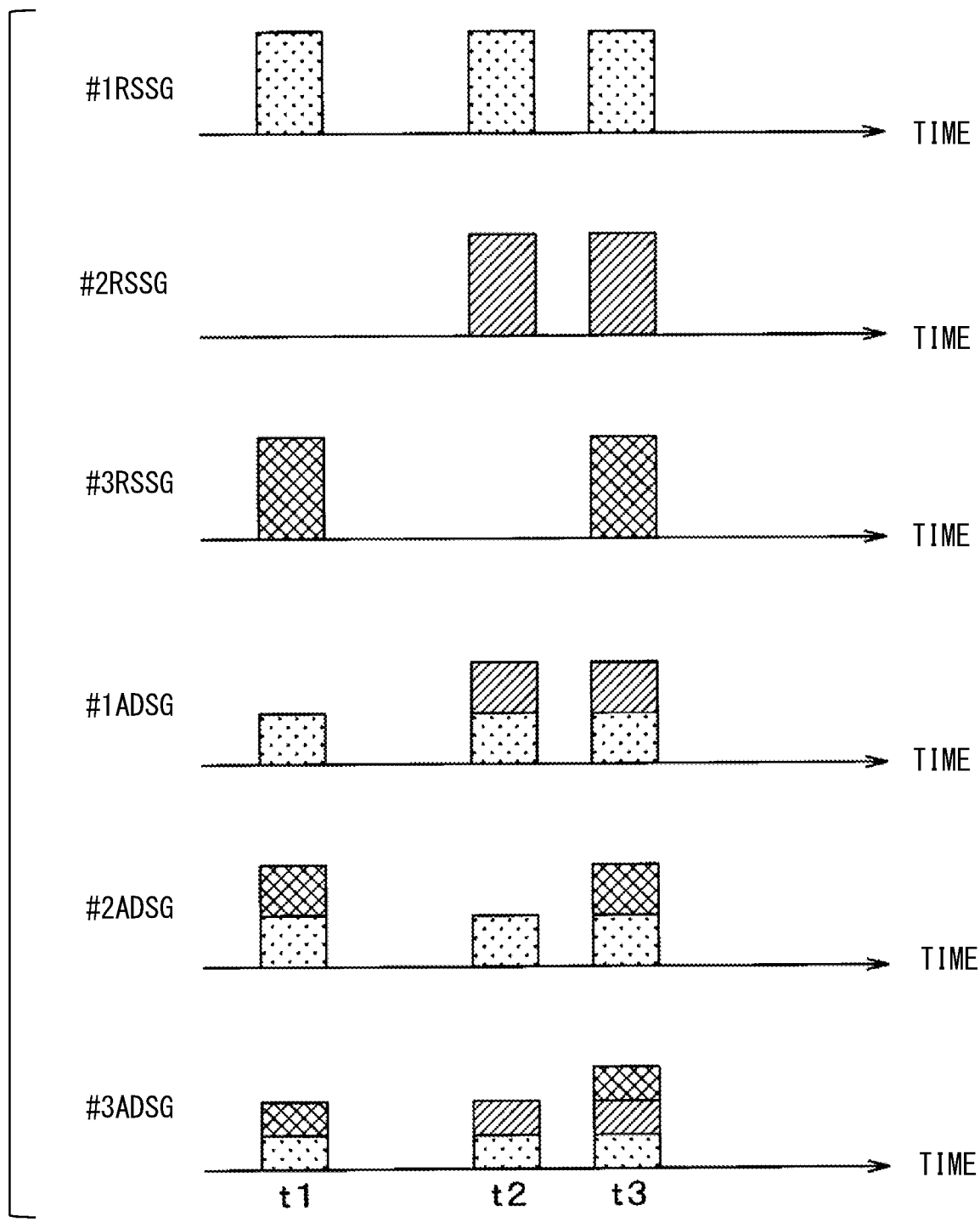
FIG. 8 is a diagram showing received signals and added signals.
Figure 11:
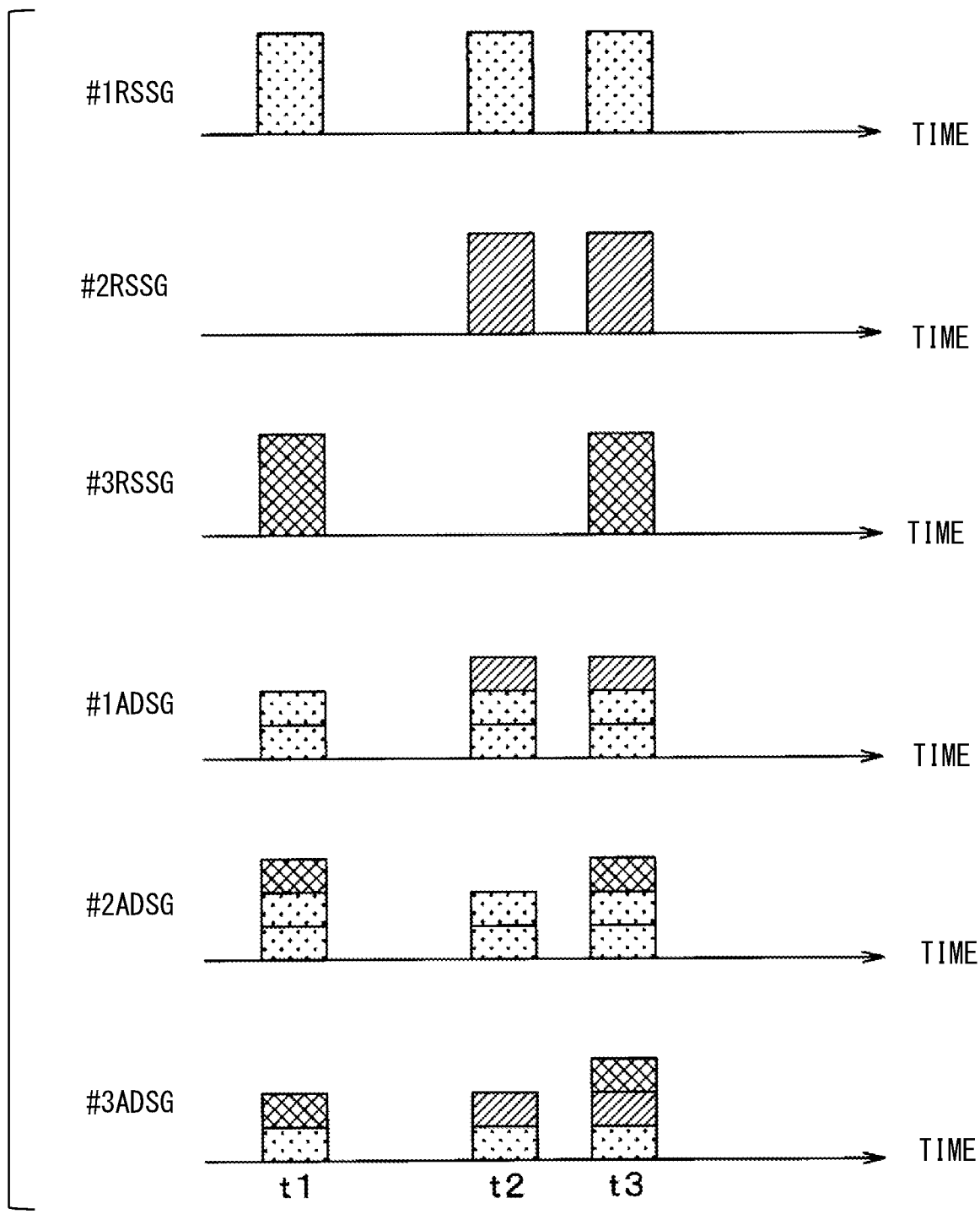
FIG. 11 is a diagram showing received signals and added signals in the second embodiment.

For example, when the main lobe ML and the two grating lobes GL1 and GL2 of the projected electromagnetic wave are reflected by three objects 100a, 100b and 100c at the positions shown in FIG. 7, the received signals are outputted as shown in FIG. 8. That is, the signal strength of the first received signal outputted from the first receiver unit 40a including the antenna unit 41a becomes high at three times t1, t2, and t3. Further, the signal strength of the second received signal outputted from the second receiver unit 40b including the antenna unit 41b becomes high at time t2 and t3. Further, the signal strength of the third received signal outputted from the third receiver unit 40c including the antenna unit 41c becomes high at time t1 and t3. In FIG. 8 and FIG. 11 described later, different hatchings are applied to the first, second, and third received signals and the first, second, and third received signals included in the added signals.

When these received signals are processed by the direction encoder unit 52, the first, second, and third added signals are converted as shown in FIG. 8. The first added signal takes greatest values in the signal strength at times t2 and t3. The second added signal takes greatest values in the signal strength at times t1 and t3. The third added signal takes greatest value in the signal strength at time t3.

The main lobe determination unit 541 determines that the signal at time t3 at which the signal strengths become the maximum commonly among the first, second, and third added signals as the received signal corresponding to the reflected electromagnetic wave caused by the main lobe ML. This signal is called the main signal.

The grating lobe determination unit 542 identifies the reflected electromagnetic wave created by the grating lobe GL1 or the reflected electromagnetic wave created by the grating lobe GL2 from the signals at the remaining times t1 and t2. The grating lobe determination unit 542 determines that the signal at time t2 at which the signal strength of the first added signal is greater than that of the second added signal as the received signal corresponding to the reflected electromagnetic wave caused by the grating lobe GL1.

The grating lobe determination unit 542 determines that the signal at time t1 at which the signal strength of the second added signal is greater than that of the first added signal as the received signal corresponding to the reflected electromagnetic wave caused by the grating lobe GL2.

The distance calculation unit 55 calculates the distance to the objects 100a, 100b, and 100c and the speed of the objects 100a, 100b, and 100c from the beat signals generated by the multiplexer units 42a, 42b, and 42c. Further, since differential angles between the main lobe ML and the grating lobes GL1 and GL2 are determined by the design of the projection unit 31, the distance calculation unit 55 calculates directions of the objects 100a, 100b and 100c based on the projection direction of the main lobe ML and the differential angles.

The effects of this embodiment is described. In order to increase the scanning angle in the ranging module, methods such as reducing the number of ranging points and/or shortening the ranging period may be considerable. However, if the number of ranging points is reduced, the spatial resolution is lowered, and if the ranging period is shortened, the SN ratio of the received signal is lowered. Therefore, a ranging performance may be lowered. In addition, it is conceivable to increase the number of systems such as the light receiving OPA, but if the number of systems is increased, the physique and cost may increase.

On the other hand, the present embodiment utilizes a configuration simultaneously receiving the reflected electromagnetic waves of both the main lobe and the grating lobe of the projected electromagnetic waves, and detects the object based on the three received signals. As a result, the scanning angle can be increased without reducing the number of ranging points and the ranging period. Further, the antenna unit 41 is composed of a plurality of units. The influence of noise is reduced by averaging and coding each received signal. It is possible to maintain a SN ratio even in the present embodiment including a plurality of antenna units. In addition, this embodiment utilizes a plurality of antenna units which may be provided by dividing the single antenna unit 41. As a result, the increase in physique due to an increase in an area of the antenna unit is suppressed. In addition, the increase in cost can be suppressed by changing combinations of electromagnetic waves received by each of the plurality of antenna units.

Second Embodiment

A second embodiment is described below. The present embodiment is a modification in which a configuration of the signal receiver unit 40 is modified from the first embodiment. Since the present embodiment is similar to the first embodiment in the other aspects, only an aspect different from the first embodiment is described.

Figure 9:
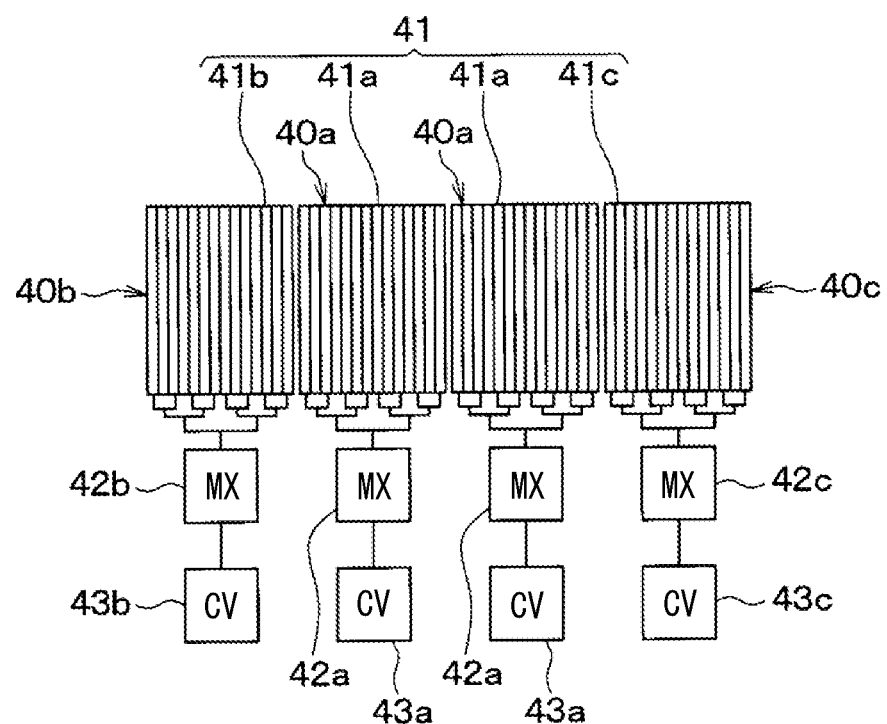
FIG. 9 is a diagram showing a configuration of a signal receiver unit according to a second embodiment.

As shown in FIG. 9, the antenna unit 41 includes four antenna units 41a, 41a, 41b, and 41c. The antenna unit 41 is divided into two antenna portions 41a and 41a, an antenna portion 41b, and an antenna portion 41c. The signal receiver unit 40 includes two first receiver units 40a and 40a. The signal processor unit 50 determines which lobe is the origin of the reflected electromagnetic wave based on combinations of the received signals received by the two first receiver units 40a and 40a, the second receiver unit 40b, and the third receiver unit 40c. The signal processor unit 50 determines whether or not the electromagnetic wave received by the signal receiver unit 40 corresponds to the reflected electromagnetic wave of the main lobe ML of the projected electromagnetic wave, whether or not the electromagnetic wave received by the signal receiver unit 40 corresponds to the reflected electromagnetic wave of the grating lobe GL1, or whether or not the electromagnetic wave received by the signal receiver unit 40 corresponds to the reflected electromagnetic wave of the grating lobe GL2. To do.

The direction encoder unit 52 adds the received signals of the two first receiver units 40a and 40a and the received signal of the second receiver unit 40b and then averages them to obtain a first added signal. The direction encoder unit 52 adds the received signals of the two first receiver units 40a and 40a and the received signal of the third receiver unit 40c and then averages them to obtain a second added signal. The direction encoder unit 52 adds the received signal of one of the first receiver unit 40a, the received signal of the second receiver unit 40b, and the received signal of the third receiver unit 40c, and then averages them to obtain a third added signal. The direction determination unit 54 and the distance calculation unit 55 calculate the distance to the object, the speed of the object, and the direction of the object identifying the main lobe ML, the grating lobe GL1, and the grating lobe GL2 similar to the first embodiment.

Figure 10:
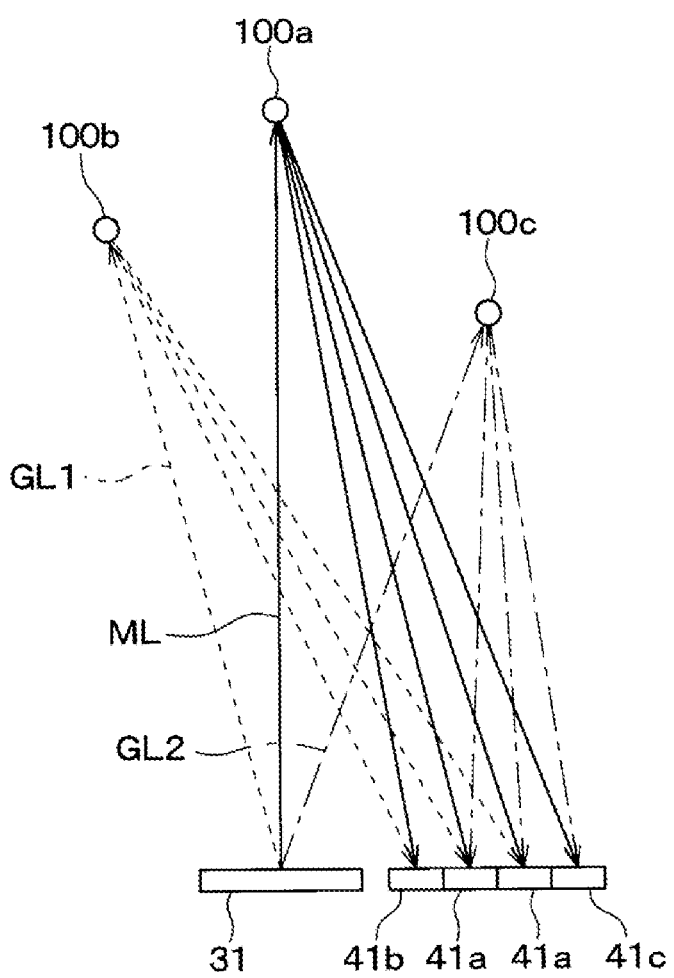
FIG. 10 is a diagram showing a state in which reflected electromagnetic waves are received by four antenna units.

For example, when the main lobe ML and the two grating lobes GL1 and GL2 of the projected electromagnetic wave are reflected by three objects 100a, 100b and 100c at the positions shown in FIG. 10, the received signals are outputted as shown in FIG. 11. That is, the signal strength of the first received signal outputted from the two first receiver units 40a and 40a becomes high at three times t1, t2, and t3. Further, the signal strength of the second received signal output from the second receiver unit 40b becomes high at time t2 and t3. Further, the signal strength of the third received signal output from the third receiver unit 40c becomes high at time t1 and t3.

When these received signals are processed by the direction encoder unit 52, the first, second, and third added signals are converted as shown in FIG. 11. The first added signal takes greatest values in the signal strength at times t2 and t3. The second added signal takes greatest values in the signal strength at times t1 and t3. The third added signal takes greatest value in the signal strength at time t3.

Based on the above, it is determined that the signal at time t3 is the received signal corresponding to the reflected electromagnetic wave created by the main lobe ML similar to the first embodiment. Further, it is determined that the signal at time t2 is the received signal corresponding to the reflected electromagnetic wave created by the one grating lobe GL1, and the signal at time t1 is the received signal corresponding to the reflected electromagnetic wave created by the other grating lobe GL2.

Then, the distance to the objects 100a, 100b, and 100c and the speed of the objects 100a, 100b, and 100c are calculated from the beat signals generated by the multiplexer units 42a, 42b, and 42c. Further, the directions of the objects 100a, 100b, and 100c are calculated based on the projection directions of the main lobe ML and the like.

Also in the present embodiment, the same effect as that of the first embodiment is achieved. Further, the signal strength of the first and second added signals are increased by configuring the system to include two antenna units 41a and 41a, and to include the received signals from the two first receiver units 40a and 40a within the first and second added signals. As a result, it is possible to improve detecting and ranging accuracy of an object.

Third Embodiment

A third embodiment is described below. The present embodiment is a modification in which a measuring method of a distance to an object is modified from the first embodiment. Since the present embodiment is similar to the first embodiment in the other aspects, only an aspect different from the first embodiment is described.

Figure 12:
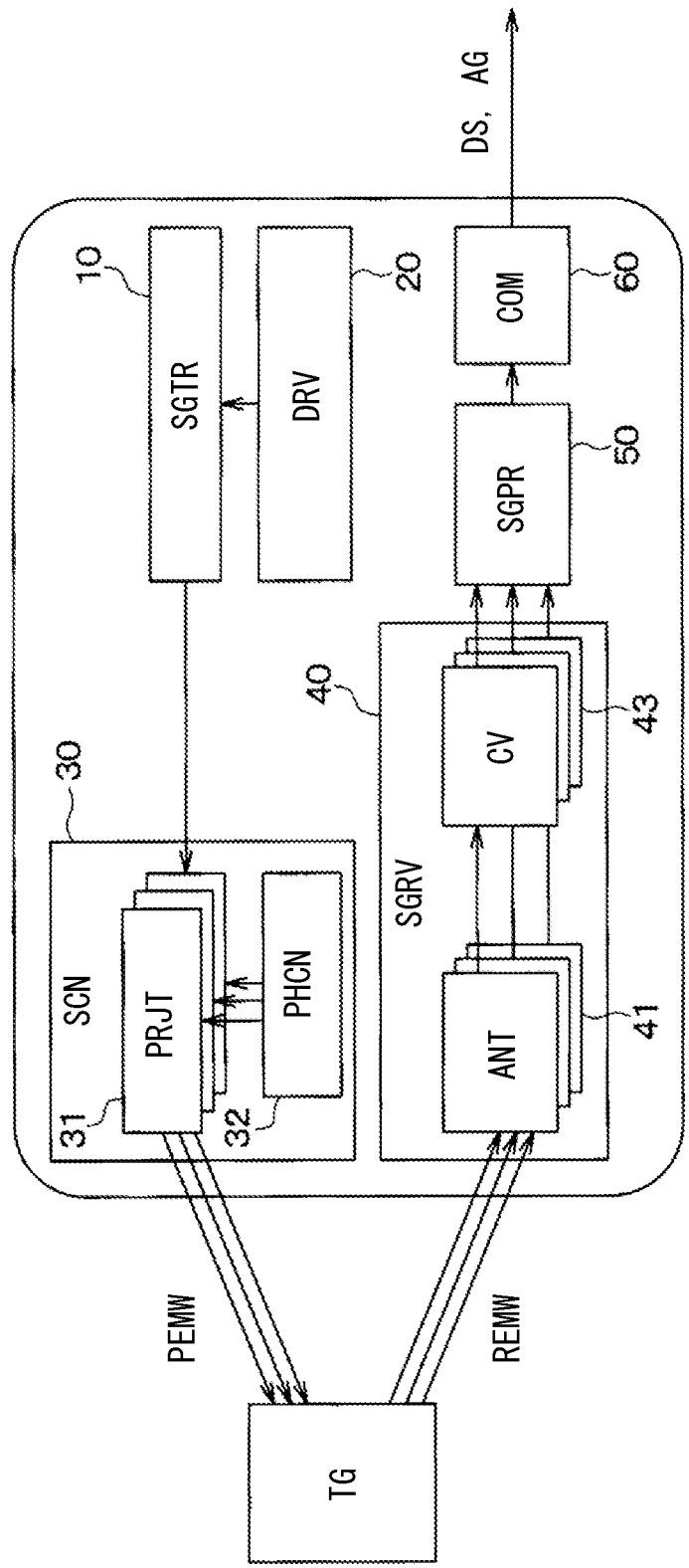
FIG. 12 is a block diagram of a ranging module device according to a third embodiment.
Figure 13:
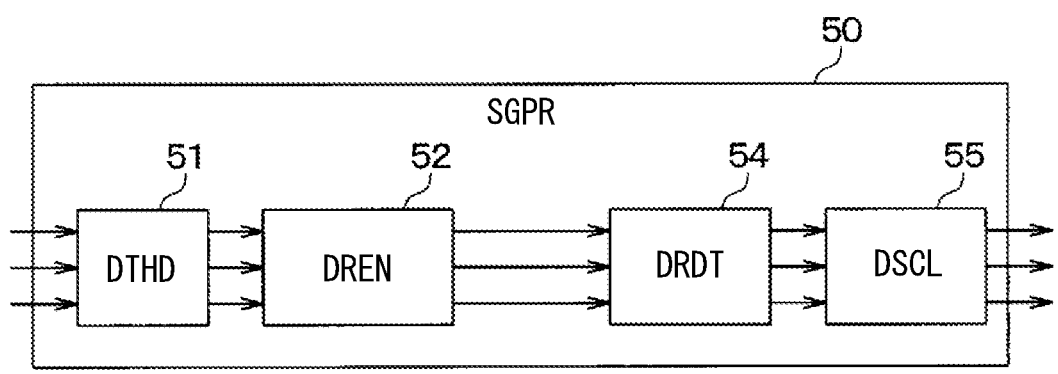
FIG. 13 is a block diagram of the signal processor unit shown in FIG. 12.

The ranging module device of this embodiment measures a distance to an object by a TOF (Time of Flight) method. Specifically, as shown in FIG. 12, the signal receiver unit 40 does not include the multiplexer unit 42, and is configured to transmit the electromagnetic wave received by the antenna unit 41 to the electric conversion unit 43 as it is. Further, as shown in FIG. 13, the signal processor unit 50 does not include the FFT processor unit 53, and is configured to transmit a signal from the direction encoder unit 52 to the direction determination unit 54.

The distance calculation unit 55 calculates the distance to the object based on the time from the transmission of the electromagnetic wave by the signal transmitter unit 10 to the reception of the reflected electromagnetic wave by the signal receiver unit 40. The communication unit 60 transmits the distance calculated by the signal processor unit 50 and the direction of the object to the ECU or the like.

Also in this embodiment measuring the distance by the TOF method in this way, the same effect as in the first embodiment is achieved.

Other Embodiments

The present disclosure is not limited to the above described embodiments and may be suitably modified within scopes described in claims.

For example, in the third embodiment, the method of measuring the distance to the object is modified from the first embodiment, but in the second embodiment, the distance may be measured by the TOF method.

The ranging module device in this disclosure comprises a plurality of electrical circuit elements. For example, the plurality of electrical circuit elements in the first embodiment provide the transmission drive unit 20, the phase control unit 32, the electric conversion unit 43, the signal processor unit 50, and the communication unit 60. The transmission drive unit 20, the phase control unit 32, the electric conversion unit 43, the signal processor unit 50, and the communication unit 60 may also be called the transmission drive circuit 20, the phase control circuit 32, the electric conversion circuit 43, the signal processor circuit 50, and the communication circuit 60, respectively. The plurality of electrical circuit elements are provided by analog circuits, digital circuits, computer circuits, or combinations thereof. The analog circuits are provided by elements such as comparator circuits, amplifier circuits, and power conversion circuits. The digital circuits includes a plurality of logic circuits. The digital circuits may be provided by a logic circuit array, e.g., ASIC: Application-Specific Integrated Circuit, FPGA: Field Programmable Gate Array, SoC: System on a Chip, PGA: Programmable Gate Array, or CPLD: Complex Programmable Logic Device. The computer circuits includes at least one processor circuit and at least one memory circuit. The memory circuits are non-transitory and tangible storage medium, which non-temporarily stores a program and/or data readable by the processor. The storage medium may be a semiconductor memory, a magnetic disk, an optical disk, or the like. The program is a collection of a plurality of instructions. The program may be distributed as a single article or as a storage medium in which the program is stored.

What is claimed is:
1. A device comprising:
a signal transmitter unit which transmits electromagnetic waves;
a scanner unit which scans the electromagnetic wave transmitted by the signal transmitter unit into space to create a projected electromagnetic wave;
a signal receiver unit which receives reflected electromagnetic waves from an object and outputs a received signal; and a signal processor unit which calculates a distance to the object based on a received signal of the signal receiver unit, wherein the signal receiver unit includes:

a first receiver unit which is designed to receive reflected electromagnetic waves created by a main lobe and two grating lobes of the projected electromagnetic wave;

a second receiver unit which is designed to receive reflected electromagnetic waves created by the main lobe and one grating lobe of the projected electromagnetic wave; and a third receiver unit which is designed to receive reflected electromagnetic waves created by the main lobe and the other grating lobe of the projected electromagnetic wave, wherein the signal processor unit determines that which one of the reflected electromagnetic waves created by the main lobe or the one grating lobe or the other grating lobe of the projected electromagnetic wave corresponds to the electromagnetic wave received by the signal receiver unit based on combinations of the received signals of the first receiver unit, the second receiver unit, and the third receiver unit, and calculates a distance to the object.

2. The device according to claim 1, wherein the signal processor unit is configured to perform:

obtaining a first added signal by adding the received signal of the first receiver unit and the received signal of the second receiver unit;

obtaining a second added signal by adding the received signal of the first receiver unit and the received signal of the third receiver unit;

obtaining a third added signal by adding the received signal of the first receiver unit, the received signal of the second receiver unit and the received signal of the third receiver unit;

determining a main signal at a time at which one of the first added signal, the second added signal, and the third added signal is the maximum in a signal strength commonly among the plurality of signals appeared in the first added signal, the second added signal, and the third added signal as a received signal output by the signal receiver unit receiving the reflected electromagnetic wave of the main lobe of the projected electromagnetic wave;

determining signals appeared greater in the first added signal than the second added signal among remaining signals excluding the main signal as a received signal output by the signal receiver unit receiving the reflected electromagnetic wave of the one grating lobe of the projected electromagnetic wave; and determining signals appeared greater in the second added signal than the first added signal as a received signal output by the signal receiver unit receiving the reflected electromagnetic wave of the other grating lobe of the projected electromagnetic wave.

3. The device according to claim 1, wherein the signal receiver unit includes two of the first receiver units, wherein the signal processor unit determines that which one of the reflected electromagnetic waves created by the main lobe or the one grating lobe or the other grating lobe of the projected electromagnetic wave corresponds to the electromagnetic wave received by the signal receiver unit based on combinations of the received signals of two of the first receiver unit, the second receiver unit, and the third receiver unit.

4. A device for processing output signal from a ranging module, the ranging module including at least three receiver units including:

a first receiver unit which is designed to receive reflected electromagnetic waves created by a main lobe and two grating lobes of a projected electromagnetic wave;

a second receiver unit which is designed to receive reflected electromagnetic waves created by the main lobe and one grating lobe of the projected electromagnetic wave; and a third receiver unit which is designed to receive reflected electromagnetic waves created by the main lobe and the other grating lobe of the projected electromagnetic wave, the device comprising:

an electric conversion circuit which converts the reflected electromagnetic waves from the first, second and third receiver unit into an electric received signal; and a signal processor circuit which receives the electric received signals, the signal processor circuit being configured to perform:

identifying which lobe, a main lobe or a one grating lobe or the other grating lobe, created a reflected electromagnetic wave which corresponds to an electric received signal output from a receiver unit; and calculating at least a distance to an object based on the identified lobe.

5. The device according to claim 4, wherein the signal processor circuit is configured to further perform:

adding the electric received signals in different combinations to obtain a plurality of added signals; and comparing the added signals to identify the lobe.

6. The device according to claim 5, wherein the signal processor circuit is configured to further perform:

determining the lobe based on signals appearing different timings on the plurality of added signals.

7. A method for processing output signal from a ranging module, the method comprising:

Identifying, by an electric circuit, which lobe, a main lobe or a one grating lobe or the other grating lobe, created a reflected electromagnetic wave which corresponds to an electric received signal output from a receiver unit; and calculating, by an electric circuit, at least a distance to an object based on the identified lobe.

8. The method according to claim 7, further comprising the steps of:

adding, by an electric circuit, two electric received signals from at least three receiver units to obtain at least two added signals; and comparing, by an electric circuit, the added signals to identify the lobe.

9. The method according to claim 8, further comprising the steps of:

determining, by an electric circuit, the lobe based on signal strength appearing different timings on a plurality of signals which is obtained by combining, in different combinations, signals corresponding to the reflected electromagnetic waves created by the main lobe or the one grating lobe or the other grating lobe.

* * * * *